(12) United States Patent
Johnston et al.

(10) Patent No.: US 7,695,745 B2
(45) Date of Patent: Apr. 13, 2010

(54) DAIRY PRODUCT AND PROCESS

(75) Inventors: Keith Johnston, Palmerston North (NZ); Allan Main, Palmerston North (NZ); Peter Dudley Elston, Palmerston North (NZ); Peter Aaron Munro, Palmerston North (NZ); Robert J. Buwalda, Palmerston North (NZ)

(73) Assignee: Fonterra Co-Operative Group Limited, Auckland (NZ)

( * ) Notice: Subject to any disclaimer, the term of this patent is extended or adjusted under 35 U.S.C. 154(b) by 1039 days.

(21) Appl. No.: 10/504,925

(22) PCT Filed: Feb. 18, 2003

(86) PCT No.: PCT/NZ03/00027

§ 371 (c)(1),
(2), (4) Date: Jan. 24, 2005

(87) PCT Pub. No.: WO03/069982

PCT Pub. Date: Aug. 28, 2003

(65) Prior Publication Data

US 2005/0123647 A1    Jun. 9, 2005

(30) Foreign Application Priority Data

Feb. 19, 2002  (NZ) ...................................... 517293
Sep. 30, 2002  (NZ) ...................................... 521690

(51) Int. Cl.
*A23C 9/12*        (2006.01)
(52) U.S. Cl. .............................. 426/36; 426/34; 426/39; 426/582
(58) Field of Classification Search .................... 426/34, 426/35, 36, 38, 39, 40, 580, 582
See application file for complete search history.

(56) References Cited

U.S. PATENT DOCUMENTS

| | | | |
|---|---|---|---|
| 4,948,599 A | | 8/1990 | Sagara et al. |
| 5,378,479 A | | 1/1995 | Trecker et al. |
| 5,431,946 A | * | 7/1995 | Vesely et al. ................. 426/582 |
| 5,895,671 A | * | 4/1999 | Adamany et al. ............. 426/36 |
| 5,925,398 A | | 7/1999 | Rizvi et al. |
| 6,319,526 B1 | * | 11/2001 | Dahlstrom et al. ............ 426/36 |
| 6,998,145 B2 | | 2/2006 | Henry et al. |

FOREIGN PATENT DOCUMENTS

| | | |
|---|---|---|
| EP | 0 089 777 | 3/1983 |
| EP | 0 639 332 A2 | 2/1995 |
| FR | 2290847 | 6/1976 |
| GB | 884762 | 12/1961 |
| JP | 2-35037 | 2/1990 |
| JP | 6-78669 | 3/1994 |
| JP | 6-189678 | 7/1994 |
| WO | WO 99/33351 | 7/1999 |

OTHER PUBLICATIONS

Kessler, Heinz-Gerhard. "The processing of the curd", chaper 16.2.6, *Food- and bio process engineering*, 2002, Verlag A. Kessler, Munich, Germany. Translation from 1988 German version.

* cited by examiner

*Primary Examiner*—Leslie Wong
(74) *Attorney, Agent, or Firm*—Knobbe Martens Olson & Bear LLP

(57) ABSTRACT

The invention provides a novel process of making cheese comprising the production of a coagulum which is caused to disaggregate into small curd particles in an in-line continuous flow process, separation of the curd particles from the whey and subsequent heating and mechanical working of the curd particles into a cheese mass.

42 Claims, 1 Drawing Sheet

DAIRY PRODUCT AND PROCESS

REFERENCE TO RELATED APPLICATIONS

The present application is the U.S. National phase of international application number PCT/NZ03/000027, filed Feb. 18, 2003, and claims priority under 35 U.S.C. §119 to New Zealand application number 517293, filed Feb. 19, 2002 and New Zealand application number 521690, filed Sep. 30, 2002.

FIELD OF THE INVENTION

The present invention relates to a novel process of making cheese and to a cheese product made by said process.

BACKGROUND OF THE INVENTION

Traditional cheesemaking processes typically form a coagulum by the addition of an enzyme that sets a vat of cheesemilk. The coagulum is then mechanically cut to form curd particles which allow syneresis to occur.

In this traditional vat setting and cutting process considerable variability in the curd characteristics can occur resulting in impaired product consistency such that compositional and functional characteristics of the final cheese may not fall within the standards acceptable by the industry or consumer.

In particular, texture, melt and flavour characteristics are important cheese characteristics. Any method of cheese making that can reduce the variability and criticality of one of the traditional cheese making steps, yet maintain flexibility in the functional characteristics of the end cheese product, gives the cheese making industry a way of producing a cheese having the required functional characteristics in a consistent manner. This is beneficial to the cheese making industry, large consumers such as the pizza industry, as well as individual consumers.

It is an object of the present invention to provide such a process and/or at least to provide the public with a useful choice.

SUMMARY OF THE INVENTION

The present invention provides a process of manufacturing cheese whereby the traditional step of producing a solid coagulated mass of protein or a coagulum from a protein containing starting milk, which requires cutting to aid separation of the curd from the whey, is replaced with a step whereby such a coagulated mass is caused to disaggregate into small curd particles without mechanical cutting and whereby the curd particles are separated from the whey by simple screen sieving or mechanical separation. The production of such curd particles provides a more reliable and consistent curd for cheese making in general. The curd produced by the present invention is then heated and mechanically worked (stretched) such as in traditional mozzarella cheese making processes by either immersing the curd in hot water or heating and working in a substantially liquid-free environment. Moreover, a range of cheeses may be made by this method including but not limited to cheddar, cheddar-like, gouda, gouda-like, as well as mozzarella and mozzarella-like (pizza) cheeses. The term mozzarella in this document includes the generic range of mozzarella cheese types including standard fat and moisture mozzarella, part-skimmed mozzarella and low-moisture mozzarella.

Other GRAS (Generally Regarded As Safe) ingredients common to cheese making process may be added at any suitable stage of the above mentioned processes to alter any functional characteristic or improve flavour, texture, colour and the like, as would be understood by a person of skill in the art.

The present invention is also directed to a cheese including a soft, semi-soft, hard and extra hard cheese produced by a process according to the invention. Preferred cheeses include cheddar, cheddar-like, gouda, gouda-like, mozzarella and mozzarella-like cheeses. By mozzarella and mozzarella-like (pizza) cheese is meant a cheese made using a process of the present invention, which has stringy characteristics on melting.

DESCRIPTION OF THE FIGURES

The present invention will now be described with reference to the figures of the accompanying drawings in which.

DETAILED DESCRIPTION OF THE INVENTION

Figure 1:
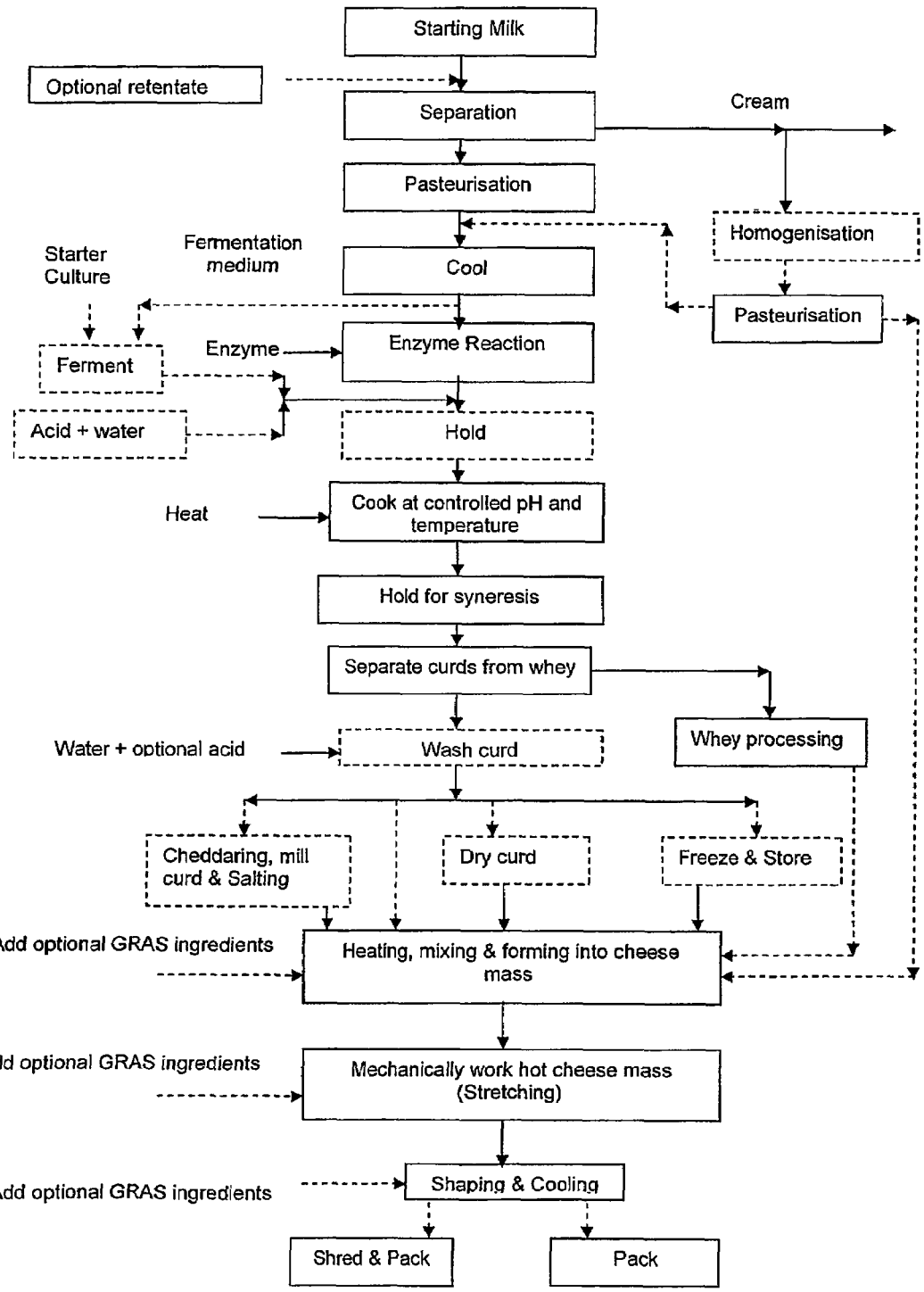
FIG. 1 shows a schematic drawing of the process of a preferred embodiment of the invention.

The present invention provides an alternative process of making a cheese having consistent compositional and functional characteristics, such as melt and sensory characteristics.

In particular it is an advantage of the present invention that the formation of the coagulum and its subsequent disaggregation into curds and whey is conducted as an in-line, continuous flow process that does not require vat setting or mechanical cutting of the coagulum.

Specifically, the novel process of the present invention comprises the continuous production of small curd particles in place of the vats of coagulated cheesemilk produced in traditional cheese making processes, in combination with a mechanical processing step whereby the curd particles are heated and worked into a cheese mass in accordance with the traditional mozzarella-type cheese making process.

Surprisingly, cheeses of all types, including soft, semi-soft, hard and extra hard such as cheddar, cheddar-like, gouda, gouda-like, as well as mozzarella and mozzarella-like cheeses may be made by this novel process.

The advantages of the novel process of the present invention include the ability to closely control the functional and compositional characteristics of the end cheese products to enable the consistent production of cheeses having enhanced functional and compositional characteristics. In particular, this process allows for the production of cheeses having a higher moisture and lower calcium content than may be achieved using traditional processes.

The continuous production of a liquid stream containing small curd particles is taught in NZ 199366 in relation to the manufacture of milk based foodstuffs including cheese and cheese-like products for incorporation as a raw material into processed foodstuffs.

The present invention uses the curd particles produced by the method of NZ 199366 in combination with a heating and mechanical processing step to produce natural cheeses including cheddar, cheddar-like, gouda, gouda-like mozzarella and mozzarella-like (pizza) cheese for the first time. In addition, the novel process allows for the control of the characteristics of the curd particles so that such cheeses have higher moisture and lower calcium content that the product produced by the method of NZ 199366 alone.

The present invention provides a method of making cheese comprising adding a coagulating agent to a pasteurised and standardised starting milk and reacting at a temperature which suppresses the formation of a coagulum, passing the reacted mixture along a flow path while adjusting the pH within a range between 4.0 to 6.0, and cooking said mixture at a temperature of up to 55° C. while inducing controlled turbulence in the mixture to cause rapid coagulation and then disaggregation into small curd particles within the flow, separating the curd particles from the whey liquid, heating and mechanically working the curd into a cheese mass at a curd temperature of 50 to 90° C., shaping and cooling the cheese mass.

The curd may be made into a final cheese product immediately while still fresh, or may be frozen and/or dried, and thawed and/or reconstituted before making into cheese.

Preferably, the invention provides a process of making cheese comprising steps of:

a. providing a starting milk composition having a fat content of at least 0.05%;
b. optionally pasteurising and/or acidifying the milk composition of step (a) to pH 6.0 to 6.5;
c. adding a coagulating agent to the starting milk composition and reacting preferably for up to 20 hours at a temperature which suppresses the formation of a coagulum;
d. optionally adjusting the pH of the reacted milk between pH 4.0 and 6.0;
e. cooking the milk composition under conditions which allows the formation of coagulated curd particles;
f. separating the whey from the curd particles;
g. optionally washing the curd particles of step (f)
h. optionally freezing and/or drying the curd particles;
i. heating and mechanically working the fresh curd particles of steps (f) or (g) or thawed and/or reconstituted curd particles of step (h), at a curd temperature of 50° C. to 90° C.; and
j. shaping and cooling the cheese mass.

The general steps of this preferred process are set out in FIG. 1 and may be carried out in any suitable order as would be appreciated by a skilled worker. Preferably steps (a) to (j) of the process are performed in the recited order.

The cheese made by this process may comprise a soft, semi-soft, hard or extra hard cheese including cheddar, cheddar-like cheese, gouda, gouda-like cheese, mozzarella and mozzarella-like cheese.

The starting milk may be selected from one or more of the group comprising whole fat milk; whole milk retentate/concentrate; semi skimmed milk; skimmed milk; skimmed retentate/concentrate; butter milk; butter milk retentate/concentrate and whey protein retentate/concentrate or from products made from milk as would be appreciated by a person skilled in the art. One or more powders, such as whole milk powder, skimmed milk powder, milk protein concentrate powder, whey protein concentrate powder, whey protein isolate powder and buttermilk powder or other powders made from milk, reconstituted or dry, singularly or in combination may also be selected as the starting milk or be added to the starting milk.

The starting milk may be sourced from any milk producing animal.

The protein and fat composition of the starting milk composition may be altered by a process known as standardisation. The process of standardisation involves removing the variability in the fat and protein composition of the starting milk to achieve a particular end cheese composition. Traditionally, standardisation of milk has been achieved by removing nearly all the fat (cream) from the starting milk (separation) and adding back a known amount of cream thereto to achieve a predetermined protein/fat ratio in the starting milk. The amount of fat (cream) required to be removed will depend upon the fat content of the starting milk and the required end cheese composition. Preferably, the starting milk has a fat content of at least 0.05%. If higher fat contents are required a separate side stream of cream may be added to raise the fat content of the starting milk or the final cheese product as would be appreciated by a skilled worker. Additionally or alternatively, the protein concentration may be altered by adding a protein concentrate such as a UF retentate or powder concentrate to a starting milk composition, or by any other method as would be appreciated by a person skilled in the art.

Pasteurisation may be carried out on any liquid stream at any stage of the process and in particular the starting milk and cream streams under standard condition as is known in the art. Optionally the cream is homogenised.

Optionally the starting milk may be preacidified using any food approved acidulent to preferably a pH of 6.0 and 6.5.

The coagulating agent is added to the standardised starting milk and the mixture agitated to distribute the agent. The starting milk composition, containing coagulating agent is reacted under conditions which will not allow the formation of a coagulum, typically at a temperature of <22° C., preferably 8 to 10° C., at a suitable concentration of enzyme for sufficient time to react with the kappa casein. Typically, this reaction period is for 3 to 20 hours. This process is known as "cold setting" or "cold rennetting". In particular, the coagulating agent is held in the starting milk for a sufficient time to allow the enzyme to cleave the bond of kappa-casein and expose the casein micelle. This starting milk would coagulate but for the temperature control of the reaction mixture.

Preferably the coagulating agent is an enzyme, and preferably the enzyme is chymosin (rennet). Sufficient coagulating agent is added to the starting milk so that the cheese milk will coagulate at the cooking step. For chymosin (rennet), this concentration ranges from 1 part rennet to 5,000 parts starting milk and 1 part rennet to 50,000 parts starting milk. A more preferred rennet concentration is between 1 part to 15,000 starting milk and 1 part to 20,000 starting milk.

At this stage the milk composition is pumped through a plant and subjected to in-line treatment.

After reacting with the coagulating agent, the pH of the milk composition (the "reacted milk") is adjusted, if necessary, to pH 4.0 to 6.0 preferably 5.2 to 6.0 by the addition of an acidulent.

Preferably the acidulent is a food grade acid such as lactic acid, acetic acid, hydrochloric acid, citric acid or sulphuric acid and is diluted with water to approximately 1 to 20% w/w and then added to the reacted milk. More preferably, strong acids such as hydrochloric acid, are diluted to 2 to 5% w/w and weak acids such as lactic acid diluted to 10 to 15% w/w before adding to the reacted milk. The acidulent may be dosed in-line, directly into the reacted milk to reduce the pH to the desired pH.

Alternatively, the acidulent may comprise a growth medium which has been inoculated with a starter culture and reacted to form a fermentate.

Pasteurised skimmilk is a preferred growth medium. Fermentation may be induced by adding a starter culture to the growth medium and holding at a suitable temperature for a suitable time for the generation of acid to lower the pH to a level of between pH 4.0 and pH 6.0, preferably pH 4.6.

The starter culture to be added to the pasteurised growth medium stream can be mesophilic or thermophilic or a mix and added at 0.0005 to 5%, preferably 0.01 to 0.2%, most preferably 0.1% of the milk volume. Examples of starter cultures are: *Streptococcus thermophilus, Lactobacillus bul-*

*garicus, Lactobacillus helveticus, Lactococcus lactis* subspecies *cremoris, Lactococcus lactis* subspecies *lactis.*

Once the fermentate stream has reached the target pH, the fermentate can be mixed in-line with the reacted milk. Where the two streams are combined, a further step of mixing and holding the two streams is required, typically for 1 to 20 minutes to ensure that, where the fermentate comprises a milk based medium, such as skimmilk, the coagulating agent in the reacted milk has time to act on the kappa casein in the fermentate. Optionally, the fermentate may be cooled and held for subsequent use.

Optionally a combination of food grade acid and fermentate may be used to acidify the reacted milk.

Once the fermentate and/or food grade acid (if required) have been added and mixed by the liquid flow or using mechanical mixers such as an in-line static mixer, and held at the target pH, the milk composition is heated/cooked preferably to a temperature of 30 to 55° C. by using direct or indirect heating means to coagulate the protein and form coagulated curd particles. In the case of direct heating, steam can be injected into the liquid milk composition flow and in the case of indirect heating, a jacketed heater or heat exchanger is associated with the pipe along which the liquid is being pumped. The final temperature reached by the curd mixture is determined by the properties required in the final cheese curd. For example to decrease the moisture retained in the curd the cook temperature is raised. In a preferred embodiment the flow velocity during cooling is high enough to ensure turbulence in the liquid mixture being passed there along. This enables the protein coagulum to fragment into small relatively uniform curd particles and syneresis commences. Preferably, the resulting curd particles are between 0.5 cm and 2 cm.

It is necessary to allow time for the syneresis to proceed. Preferably the holding time in the cooking tube is 10 to 50 seconds at the desired final cooking temperature and the flow is laminar. The cooked mixture is passed to a separator to separate the curds from the whey. The separation may be achieved by any physical means, preferably by sieve or decanter. Optionally, after separation of the curd, the curd may be washed in water. In a preferred embodiment the pH of the water may be adjusted and the washing system may consist of a set of holding tubes. At the end of the holding tubes the washed curd may be separated by any physical means, preferably by sieve or decanter.

A reduction of the pH in the wash water results in solubilisation and removal of calcium from the curd. A preferred embodiment is washing under turbulent conditions with heated water at between 30 and 90° C. at pH 3.0 to 5.4.

Mineral adjustment, and particularly calcium adjustment, is a critical step in the cheesemaking process as the calcium content of the end cheese product affects its functionality and compositional characteristics. The pH of the acidulent, the pH target of the acidulated enzyme treated mixture, the cooking temperature and the pH of the wash water (if used) are all steps in this process where calcium solubilisation can be controlled. Surprisingly, the present invention allows a cheese product to be produced with a significantly lower calcium content than can be achieved using a traditional cheese making process.

The removal of whey and subsequent wash water is referred to in the art as dewheying and dewatering. Optionally the dewheyed/dewatered curd may be frozen and held for future use. In a further option the dewheyed/dewatered curd may be dried. In a further option the dewheyed/dewatered curd may be allowed to cheddar into a cohesive mass of curd. Cheddaring is known in the art of cheesemaking. The cheddared curd is subsequently milled into particles and optionally salted.

In more traditional cheese making processes all the salt or a portion of the salt is added at this point or none at all. If salt is added after milling, time is allowed for the salt to penetrate the curd (mellowing).

In the next stage of the process the curd particles are converted into a cheese mass by fusing them together by mechanically working and heating at a suitable temperature. In a preferred embodiment a heated mixing device is used to fuse the curd particles. A time of 1 to 30 minutes is required to conduct the mixing and heating procedure to attain a homogenous cheese mass. About 8 to 12 minutes are preferred.

The heating and mechanical working (stretching) step takes place at a curd temperature of between about 50° C. and 90° C. and may occur by immersing the curd in hot water or hot whey as in a traditional mozzarella cheese making method, or this step may take place in a dry environment as described in U.S. Pat. No. 5,925,398 and U.S. Pat. No. 6,319, 526. In either method, the curd is heated and worked into a homogenous, plastic mass. Preferably the curd is heated to a curd temperature of between about 50° C. to 75° C. using equipment common in the art, such as a single or twin screw stretcher/extruder type device or steam jacketed and/or infusion vessels equipped with mechanical agitators (waterless cookers).

Optionally cream, high fat cream or milk fat, water, whey protein retentate or whey protein concentrate or salt may be added to the curd during this mixing step. When cream is added, the cream is preferably homogenised.

The hot cheese mass may be immediately extruded into moulds or hoops and the cheese cooled by spraying chilled water/brine onto the surface of the hoops as in traditional mozzarella cheese making processes. This initial cooling step hardens the outside surface of the block providing some rigidity. Following this initial cooling the cheese is removed from the moulds and placed in a salt brine (partially or completely saturated) bath for a period of time to completely cool the cheese and enable uptake of the salt to the required level. Once cooled the cheese is placed in plastic liners, air removed and the bag is sealed Alternatively, the hot cheese mass may be extruded into sheet-like or ribbon-like form and directly cooled without moulding.

An alternative process sometimes used in commercial practice is to completely dry salt the cheese curd, mellow, heat work and pack directly into plastic liners contained in hoops and the liners sealed. The hoops plus cheese are then immersed in chilled water.

Cooled cheese is stored at between 2° C. to 10° C. Once ready for use the cheese may be used directly or the block frozen or the block shredded and the shreds frozen.

Where the hot cheese mass is extruded as a ribbon or sheet, which provides rapid cooling, shredding and freezing of the shreds may take place in-line, immediately following cooling.

Other GRAS (generally accepted as safe) ingredients common to the cheese making process may be added at any suitable step in the process as would be appreciated by a person skilled in the art. GRAS ingredients include non-dairy ingredients such as stabilisers, emulsifiers, natural or artificial flavours, colours, starches, water, gums, lipases, proteases, mineral and organic acid, structural protein (soy protein or wheat protein), and anti microbial agents as well as dairy ingredients which may enhance flavour and change the protein to fat ratio of the final cheese. In particular, flavour ingredients may comprise various fermentation and/or enzyme derived products or mixtures thereof as would be appreciated by a skilled worker. Preferably, such GRAS ingredients may be added after the curd has been milled and/or during the "dry" mechanical working step; and/or to the extruded sheet-like or ribbon-like hot stretched curd; and mixed or worked into the curd to disperse evenly. Alternatively, GRAS ingredients may be added to the starting milk, during in-line acidification, or to the separated coagulated curd particles as would be understood by a skilled worker. The flexibility of allowing any combination of additives to be added at any step in the process allows the final composition of the cheese to be precisely controlled, including the functionality characteristics.

In a further embodiment, the present invention provides a soft, semi-soft, hard or extra hard cheese product produced by the processes of the invention.

In a further embodiment, the present invention provides a mozzarella or mozzarella-like (pizza) cheese product produced by the processes of the invention.

The present invention also provides a food product comprising the mozzarella or mozzarella-like (pizza) cheese of the present invention, such as a pizza.

Any ranges mentioned in this patent specification are intended to inherently include all of the possible values within the stated range.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples.

EXAMPLE 1

Approximately 1800 L of skimmilk was pasteurized and then cooled to 8 to 10° C. before rennet was added (100 ml). The renneted milk was left to stand overnight for approximately 16 hours at 10° C. Dilute sulphuric acid was then added to the cold renneted milk, in-line immediately prior to cooking, to reduce the pH to pH 5.4. The mixture was heated by direct steam injection at 42 to 44° C. and held for 50 seconds in holding tube. The coagulated cooked curd particles were separated from the whey using a screen, washed using acidified water (8.3 L water, pH 2.6, dilute sulphuric acid/1 kg curd) and separated from the wash water using a decanter. After dewatering the curd was frozen for later use.

On thawing the aggregated curd was milled and partially dried using a ring drier to 48% moisture. Salt (0.2 kg), high fat cream (7 kg), 0.272 kg of lactic acid (16% solution) and flavours were added to 7 kg of milled and partially dried curd.

The flavours comprised a mixture of pre-prepared concentrated fermentation and enzyme-derived flavour ingredients [1.5% Alaco EMC (DairyConcepts, USA), 350 ppm Butyric acid and 16 mM acetate in final product (Bronson & Jacobs Ltd, NZ)].

The curd and added ingredients were blended in a twin screw auger blender/cooker (Blentech Kettle, model CL0045, Twin screwcooker 1994, Rohnert Park, Calif., United States of America) for approximately 30 seconds at 50 rpm. Speed of mixing was increased to 90 rpm and direct steam injection applied to bring the temperature of the mixture to 50° C. Mixing speed was then further increased to 150 rpm and the temperature raised to approximately 68° C. Once at approximately 68° C. the now molten curd mixture was worked at 150 rpm for a further 1 minute.

The molten curd was held for 1 to 3 minutes and then packaged into 0.5 kg pottles and the pottles were air cooled for >12 hours to approximately 5° C.

After 1 month storage this cheese had a firm texture and exhibited a cheesy-cheddar-like flavour.

The final cheese composition was 35.0% fat, 38.5% moisture, 1.84% salt, pH 5.44 and a calcium level of 101 mmol Ca/kg cheese.

EXAMPLE 2

Approximately 1800 L of skimmilk was pasteurized and then cooled to 10° C. before rennet was added (100 ml). The renneted milk was left to stand overnight approximately 16 hours at 10° C. Dilute sulphuric acid was then added to the cold renneted milk, in-line immediately prior to cooking, to reduce the pH to pH 5.4, and the mixture heated by direct steam injection at 42 to 44° C. and held for 50 seconds in a holding tube. The coagulated curd particles were separated from the whey using a screen, washed using acidified water (8.3 L water, pH 2.6, dilute sulphuric acid/1 kg curd) and separated from the wash water using a decanter. After dewatering the curd was frozen for later use.

On thawing the coagulated curd was milled and partially dried using a ring drier to 49% moisture. Salt (0.265 kg), high fat cream (6.25 kg), 0.272 kg of lactic acid (16% solution) and flavours were added to 7 kg of milled and partially dried curd.

The flavours comprised prepared concentrated fermentation and enzyme-derived flavour ingredients [50 ppm Butyric acid, 8 mM acetate and 2.5 ppm diacetyl in final product (Bronson and Jacobs Ltd, NZ) and 1 ppm Lactone].

The curd and added ingredients were blended and heated according to the procedure given in Example 1.

The molten curd was packaged into 0.5 kg pottles and the pottles were air cooled for >12 hours.

Following cooling the curd was analysed for moisture, fat, salt and pH.

After 1 month storage this cheese had a firm texture and exhibited a sweet Gouda-like flavour.

The final cheese composition was 35.5% fat, 39.1% moisture, 1.81% salt, pH 5.51 and a calcium level of 54 mmol Ca/kg cheese.

EXAMPLE 3

Approximately 1800 L of skimmilk was pasteurised and then cooled to 8 to 10° C. before rennet was added (100 ml, i.e. 55 ml/1000 L). The renneted milk was left to stand for approximately 16 hours at 8 to 10° C. After 16 hours dilute sulphuric acid was added to the cold renneted milk, in-line immediately prior to cooking, to reduce the pH to pH 5.3 and the mixture heated by direct steam injection at 42° C. and held for 50 seconds in a holding tube.

The coagulated curd particles were separated from the whey using a screen and washed using acidified water (8.3 L water, pH 2.6, dilute sulphuric acid/1 kg curd). The washed coagulated curd particles, with a moisture content of about 52%, were separated from the wash water using a decanter. After dewatering the curd was milled. Salt (0.2 kg), water (2.0 kg) and high fat cream (4.0 kg) were added to 7 kg of milled curd.

The curd and ingredients were blended according to the procedure given in Example 1, with the exception that the final temperature was 72° C.

The molten curd was packaged into 0.5 kg pottles and the pottles were air (<10° C.) for >12 hours.

Following cooling the curd was analysed for moisture, fat, salt and pH.

The final cheese composition was 21.0% fat, 53.7% moisture, 1.42% salt, pH 5.42 and a calcium level of 61 mmol/kg cheese.

The cheese made by this process was a mozzarella or mozzarella-like cheese. Within 10 days following manufacture pizzas were made to evaluate cheese functionality. Cheese made by this process showed similar functional properties in terms of blister size, coverage and colour, background colour, melt appearance, oil off, stretch characteristics and in-mouth tenderness as a conventionally made mozzarella cheese.

EXAMPLE 4

Approximately 1200 L of reconstituted skimmilk powder (8.3% solids) was pasteurized and then cooled to 8 to 10° C. before rennet was added (66 ml). The renneted milk was subsequently acidified with diluted sulphuric acid (2.5% w/w), cooked (42 to 45° C.) and the coagulated curd separated and washed as outlined in Example 3

Salt (0.2 kg), water (1.8 kg), lactic acid (0.272 kg of a 16% solution) and high fat cream (4.0 kg) were added to 7 kg of milled curd.

The curd and added ingredients were blended in a twin screw auger blender/cooker, heated to ≈72° C. and packed and stored under chilled conditions as outlined in Example 3.

The final cheese composition was 21.5% fat, 52.9% moisture, 1.40% salt, pH 5.80 and a calcium level of 106 mmol/kg cheese.

The cheese made by this process was a mozzarella or mozzarella-like cheese. Within 10 days following manufacture pizzas were made to evaluate cheese functionality. Cheese made by this process showed similar functional properties in terms of blister size, coverage and colour, background colour, melt appearance, oil off, stretch characteristics and in-mouth tenderness as a conventionally made mozzarella cheese.

EXAMPLE 5

Approximately 2250 L of skimmilk was pasteurised and then cooled to 15° C. before a microbial enzyme Fromase 45TL (DMS Food Specialities, NSW, Australia) was added (200 ml). The Fromase treated milk was left to stand for approximately 3 hours at 15° C. After 3 hours dilute sulphuric acid was added to the cold renneted milk, in-line immediately prior to cooking at 45° C., to reduce the pH to pH 5.35. The cooking and washing process used was as outlined in Example 3.

The coagulated curd particles with a moisture content of about 53% were separated from the wash water using a decanter. After dewatering separation the curd was milled. Salt (0.2 kg), water (2.0 kg) and high fat cream (4.0 kg) were added to 7 kg of milled curd. The curd and ingredients were blended in a twin screw auger blender/cooker, heated to ≈72° C. and packed and stored under chilled conditions as outlined in Example 3. The final cheese composition was 20.5% fat, 55.6% moisture, 1.42% salt, pH. 5.97 and a calcium level of 93 mmol/kg cheese.

The cheese made by this process was a mozzarella or mozzarella-like cheese. Within 10 days following manufacture pizzas made to evaluate cheese functionality. Cheese made by this process showed similar functional properties in terms of blister size, coverage and colour, background colour, melt appearance, oil off, stretch characteristics and in-mouth tenderness as a conventionally made mozzarella cheese.

EXAMPLE 6

Approximately 450 L of skimmilk was pasteurised and then cooled to 7° C. before a microbial enzyme Fromase 45TL (DMS Food Specialities, NSW, Australia) was added (40 ml). The Fromase treated milk was left to stand for approximately 3 hours at 7° C. After 3 hours dilute sulphuric acid was added to the cold renneted milk, in-line immediately prior to cooking at 50° C., to reduce the pH to pH 5.35. The cooking and washing process used was as outlined in Example 3.

The coagulated curd particles with a moisture content of about 53% were separated from the wash water using a decanter. After dewatering separation the curd was milled.

Salt (0.2 kg), water (2.0 kg) and high fat cream (4.0 kg) were added to 7 kg of milled curd. The curd and ingredients were blended in a twin screw auger blender/cooker, heated to ≈72° C. and packed and stored under chilled conditions as outlined in Example 3.

The final cheese composition was 21% fat, 55.0% moisture, 1.44% salt, pH. 5.98 and a calcium level of 92 mmol/kg cheese.

The cheese made by this process was a mozzarella or mozzarella-like cheese. Within 10 days pizzas were made to evaluate cheese functionality. Cheese made by this process showed similar functional properties in terms of blister size, coverage and colour, background colour, melt appearance, oil off, stretch characteristics and in-mouth tenderness as a conventionally made mozzarella cheese.

EXAMPLE 7

Approximately 450 L of skimmilk was pasteurised and then cooled to 7° C. before a microbial enzyme Fromase 45TL (DMS Food Specialities, NSW, Australia) was added (40 ml). The Fromase treated milk was left to stand for approximately 3 hours at 7° C. After 3 hours dilute sulphuric acid was added to the cold renneted milk, in-line immediately prior to cooking at 38° C., to reduce the pH to pH 5.35. The cooking process used was as outlined in Example 3. Washing was not carried out.

The coagulated curd particles with a moisture content of about 54% were separated from the whey using a decanter. After whey separation the curd was milled. Salt (0.2 kg), water (2.0 kg) and high fat cream (4.0 kg) were added to 7 kg of milled curd. The curd and ingredients were blended in a twin screw auger blender/cooker, heated to ≈72° C. and packed and stored under chilled conditions as outlined in Example 3. The final cheese composition was 23% fat, 50% moisture, 1.61% salt, pH. 5.87 and a calcium level of 115 mmol/kg cheese.

The cheese made by this process was a mozzarella or mozzarella-like cheese. Within 10 days of manufacture pizzas were made to evaluate cheese functionality. Cheese made by this process showed similar functional properties in terms of blister size, coverage and colour background colour, melt appearance, oil off, stretch characteristics and in-mouth tenderness as a conventionally made mozzarella cheese.

EXAMPLE 8

Approximately 2250 L of skimmilk was pasteurized and cooled to 8 to 10° C. and rennet was added (125 ml, i.e. 55 ml/1000 L). The renneted milk was left to stand overnight for approximately 16 hours at 8 to 10° C. A second milk stream comprising 900 L of skimmilk and a lactic acid culture (*Lactococcus lactis* subspecies *cremoris*) was prepared and also left to stand overnight for approximately 16 hours at 26° C. to reduce the pH of the milk to pH 4.6. The second milk stream was then added to the cold renneted milk and mixed. The pH of the mixture was 5.3. The mixture was then cooked using direct steam injection at 48° C. and held for 50 seconds in a holding tube. The coagulated curd particles were separated from the whey using a screen and washed using acidified water (8.3 L water, pH 2.6, dilute sulphuric acid/1 kg curd). The washed, coagulated curd with a moisture content of about 53% was separated from the wash water using a decanter, milled and salted. Salt (0.2 kg), water (1.4 kg) and high fat cream (4 kg) were added to 7 kg of milled curd. The curd and added ingredients were blended in a twin screw auger blender/cooker, heated to ≈62° C. and packed and stored under chilled conditions as outlined in Example 3.

The final cheese composition was 22.2% fat, 54.3% moisture, 1.50% salt, pH 5.09, and a calcium level of 53 mmol/kg cheese.

The cheese made by this process was a mozzarella or mozzarella-like cheese. Within 10 days of manufacture pizzas were made to evaluate cheese functionality. Cheese made by this process showed similar functional properties in terms of blister size, coverage and colour, background colour, melt appearance, oil off, stretch characteristics and in-mouth tenderness as a conventionally made mozzarella cheese.

In the ensuing examples, the coagulated curd particles were separated from the whey using a screen and washed using acidified water (8.3 L water, pH 2.6, dilute sulphuric acid/1 kg curd). The washed, coagulated curd was separated from the wash water using a decanter and typically had a moisture content of between 52 and 54% w/w.

EXAMPLE 9

Approximately 600 L of skimmilk was pasteurised and then cooled to 8 to 10° C. before rennet was added (33 ml). The renneted milk was left to stand for approximately 16 hours at 8 to 10° C. After 16 hours dilute lactic acid (0.25 M) was added to the cold renneted milk, in-line immediately prior to cooking at 42 to 45° C., to reduce the pH to pH 5.35. The cooking and washing process used was as outlined in Example 3.

After dewatering the curd was milled and salted. Salt (0.2 kg), water (1.9 kg) and high fat cream (4.0 kg) and Lactic acid (0.272 kg of a 16% solution) were added to 7 kg of milled curd. The curd and ingredients were blended in a twin screw auger blender/cooker, heated to ≈60° C. and packed and stored under chilled conditions as outlined in Example 3.

The final cheese composition was 20.5% fat, 54.3% moisture, 1.37% salt, pH. 5.64 and a calcium level of 93 mmol/kg cheese.

The cheese made by this process was a mozzarella or mozzarella-like cheese. Within 10 days of manufacture pizzas were made to evaluate cheese functionality. Cheese made by this process similar functional properties in terms of blister size, coverage and colour, background colour, melt appearance, oil off, stretch characteristics and in-mouth tenderness as a conventionally made mozzarella cheese.

EXAMPLE 10

Approximately 600 L of skimmilk was pasteurized and then cooled to 8 to 10° C. before rennet was added (33 ml). The renneted milk was left to stand overnight approximately 16 hours at 8 to 10° C. Dilute acetic acid (0.25 M) was then added to the cold renneted milk, in-line immediately prior to cooking at 42 to 45° C., to reduce the pH to pH 5.35. The cooking and washing process used was as outlined in Example 3.

After dewatering the curd was milled and salted. Salt (0.2 kg), water (1.9 kg), high fat cream (4.0 kg), lactic acid (0.272 kg of a 16% solution) were added to 7 kg of milled curd.

The curd and added ingredients were blended in a twin screw auger blender/cooker, heated and to ≈65° C. and packed and stored under chilled conditions as outlined in Example 3.

The final cheese composition was 20.5% fat, 54.1% moisture, 1.39% salt, pH 5.64 and a calcium level of 101 mmol/kg cheese.

The cheese made by this process was a mozzarella or mozzarella-like cheese. Within 10 days of manufacture pizzas were made to evaluate cheese functionality. Cheese made by this process showed similar functional properties in terms of blister size, coverage and colour, background colour, melt appearance, oil off, stretch characteristics and in-mouth tenderness as a conventionally made mozzarella cheese.

EXAMPLE 11

Approximately 600 L of skimmilk was pasteurized and then cooled to 8 to 10° C. before rennet was added (33 ml). The renneted milk was left to stand overnight approximately 16 hours at 8 to 10° C. Dilute hydrochloric acid (0.25 M) was then added to the cold renneted milk, in-line immediately prior to cooking at 42 to 45° C., to reduce the pH to pH 5.35. The cooking and washing process used was as outlined in Example 3.

After dewatering the curd was milled. Salt (0.2 kg), water (1.9 kg), high fat cream (4.0 kg), lactic acid (0.272 kg of a 16% solution) were added to 7 kg of milled curd.

The curd and added ingredients were blended in a twin screw auger blender/cooker, heated to ≈65° C. and packed and stored under chilled conditions as outlined in Example 3.

The final cheese composition was 21.0% fat, 53.3% moisture, 1.41% salt, pH 5.64 and a calcium level of 99 mmol/kg cheese.

The cheese made by this process was a mozzarella or mozzarella-like cheese. Within 10 days of manufacture pizzas were made to evaluate cheese functionality. Cheese made by this process showed similar functional properties in terms of blister size, coverage and colour, background colour, melt appearance, oil off, stretch characteristics and in-mouth tenderness as a conventionally made mozzarella cheese.

EXAMPLE 12

Approximately 600 L of skimmilk was pasteurized and then cooled to 8 to 10° C. before rennet was added (33 ml). The renneted milk was left to stand overnight approximately 16 hours at 8 to 10° C. Dilute sulphuric acid (0.25 M) was then added to the cold renneted milk, in-line immediately prior to cooking at 42 to 45° C., to reduce the pH to pH 5.35. The cooking and washing process used was as outlined in Example 3.

After dewatering the curd was milled. Salt (0.2 kg), high fat cream (4.0 kg) and lactic acid (0.272 kg of a 16% solution) were added to 7 kg of milled curd.

The curd and added ingredients were blended in a twin screw auger blender/cooker, heated to ≈65° C. and worked as outlined in Example 3

Once at approximately 65° C. water (0.95 kg) was added and the now molten curd mixture was worked at 150 rpm for a further 1 minute.

The molten curd was then packed and stored under chilled conditions as outlined in Example 3.

The final cheese composition was 21.0% fat, 54.0% moisture, 1.39% salt, pH 5.52 and a calcium level of 91 mmol/kg cheese.

The cheese made by this process was a mozzarella or mozzarella-like cheese. Within 10 days of manufacture pizzas were made to evaluate cheese functionality. Cheese made by this process showed similar functional properties in terms of blister size, coverage and colour, background colour, melt appearance, oil off, stretch characteristics and in-mouth tenderness as a conventionally made mozzarella cheese.

EXAMPLE 13

Approximately 2250 L of skimmilk was pasteurized and then cooled to 8 to 10° C. before rennet was added (125 ml). The renneted milk was left to stand overnight approximately 16 hours at 8 to 10° C. Dilute sulphuric acid (0.25 M) was then added to the cold renneted milk, in-line immediately prior to cooking at 42 to 45° C., to reduce the pH to pH 5.35. The cooking and washing process used was as outlined in Example 3

After dewatering the curd was milled. Salt (0.18 kg), emulsification salts (0.035 kg trisodium citrate), water (2.4 kg), high fat cream (4.15 kg) and lactic acid (0.272 kg of a 16% solution) were added to 7 kg of milled curd.

The curd and added ingredients were blended in a twin screw auger blender/cooker, heated to ≈65° C. and packed and stored under chilled conditions as outline in Example 3.

The final cheese composition was 21.0% fat, 54.5% moisture, 1.24% salt, pH 5.84 and a calcium level of 91 mmol/kg cheese.

The cheese made by this process was a mozzarella or mozzarella-like cheese. Within 10 days of manufacture pizzas were made to evaluate cheese functionality. Cheese made by this process showed similar functional properties in terms of blister size, coverage and colour, background colour, melt appearance, oil off, stretch characteristics and in-mouth tenderness as a conventionally made mozzarella cheese.

EXAMPLE 14

Approximately 2250 L of skimmilk was pasteurized and then cooled to 8 to 10° C. before rennet was added (125 ml). The renneted milk was left to stand overnight approximately 16 hours at 8 to 10° C. Dilute sulphuric acid (0.25 m) was then added to the cold renneted milk, in-line immediately prior to cooking at 42 to 45° C., to reduce the pH to pH 5.35. The cooking and washing process used was as outlined in Example 3.

After dewatering the curd was milled. Salt (0.22 kg), gums (1.4 kg of an aqueous 10% kappa carrageenan solution), water (1.3 kg), high fat cream (4.0 kg) and lactic acid (0.272 kg of a 16% solution) were added to 7 kg of milled curd.

The curd and added ingredients were blended in a twin screw auger blender/cooker, heated to ≈65° C. and packed and stored under chilled conditions as outlined in Example 3.

The final cheese composition was 21.5% fat, 53.3% moisture, 1.61% salt and pH 5.78 and a calcium level of 98 mmol/kg cheese.

The cheese made by this process was a mozzarella or mozzarella-like cheese. Within 10 days of manufacture pizzas were made to evaluate cheese functionality. Cheese made by this process showed similar functional properties in terms of blister size, coverage and colour background colour, melt appearance, oil off, stretch characteristics and in-mouth tenderness as a conventionally made mozzarella cheese.

EXAMPLE 15

Approximately 2250 L of skimmilk was pasteurized and then cooled to 8 to 10° C. before rennet was added (125 ml). The renneted milk was left to stand overnight approximately 16 hours at 8 to 10° C. Dilute sulphuric acid (0.25 m) was then added to the cold renneted milk, in-line immediately prior to cooking at 42 to 45° C., to reduce the pH to pH 5.35. The cooking and washing process used was as outlined in Example 3.

After dewatering the curd was milled. Salt (0.21 kg), whey protein concentrate (cheese whey derived with 80% protein) derived from cheese whey (0.385 kg of an aqueous 20% solution), water (2.15 kg), high fat cream (4.15 kg) and lactic acid (0.272 kg of a 16% solution) were added to 7 kg of milled curd.

The curd and added ingredients were blended in a twin screw auger blender/cooker, heated at ≈65° C. and packed at stored under chilled conditions as outlined in Example 3.

The final cheese composition was 20.0% fat, 55.1% moisture, 1.40% salt, pH 5.82 and a calcium level of 92 mmol/kg cheese.

The cheese made by this process was a mozzarella or mozzarella-like cheese. Within 10 days of manufacture pizzas made to evaluate cheese functionality. Cheese made by this process showed similar functional properties in terms of blister size, coverage and colour, background colour, melt appearance, oil off, stretch characteristics and in-mouth tenderness as a conventionally made mozzarella cheese.

EXAMPLE 16

Approximately 1800 L of skimmilk was pasteurized and then cooled to 8 to 10° C. before rennet was added (100 ml). The renneted milk was left to stand overnight approximately 16 hours at 8 to 10° C. Dilute sulphuric acid was then added to the cold renneted milk, in-line immediately prior to cooking at 42 to 44° C., to reduce the pH to pH 5.3. The cooking and washing process used was as outlined in Example 3.

After dewatering the curd was frozen for later use. On thawing the aggregated curd was milled. Water (1.8/kg), salt (0.2 kg), high fat cream (4 kg) and 0.272 kg of lactic acid (16% solution) were added to 7 kg of milled curd.

The curd and added ingredients were blended in a twin screw auger blender/cooker, heated to ≈68° C. and packed and stored under chilled conditions as outlined in Example 3.

The final cheese composition was 22.0% fat, 54.0% moisture, 1.41% salt, pH 5.38 and a calcium level of 73 mmol/kg cheese.

The cheese made by this process was a mozzarella or mozzarella-like cheese. Within 10 days of manufacture pizzas were made to evaluate cheese functionality. Cheese made by this process showed similar functional properties in terms of blister size, coverage and colour, background colour, melt appearance, oil off, stretch characteristics and in-mouth tenderness as a conventionally made mozzarella cheese.

EXAMPLE 17

Approximately 1800 L of skimmilk was pasteurized and then cooled to 8 to 10° C. before rennet was added (100 ml). The renneted milk was left to stand overnight approximately 16 hours at 8 to 10° C. Dilute sulphuric acid was then added to the cold renneted milk, in-line immediately prior to cooking at 42 to 44° C., to reduce the pH to pH 5.3. The cooking and washing process used was as outlined in Example 3.

After dewatering the curd was allowed to cheddar and frozen for later use. On thawing the cheddared curd was milled. Water (1.45 kg), salt (0.2 kg), high fat cream (3.5 kg) and 0.272 kg of lactic acid (16% solution) were added to 7 kg of milled curd.

The curd and added ingredients were blended in a twin screw auger blender/cooker, heated to ≈68° C. and packed and stored under chilled conditions as outlined in Example 3.

The final cheese composition was 21.0% fat, 53.6% moisture, 1.49% salt, pH 5.31 and a calcium level of 63 mmol/kg cheese.

The cheese made by this process was a mozzarella or mozzarella-like cheese. Within 10 days of manufacture pizzas were made to evaluate cheese functionality. Cheese made by this process showed similar functional properties in terms of blister size, coverage and colour, background colour, melt appearance, oil off, stretch characteristics and in-mouth tenderness as a conventionally made mozzarella cheese.

EXAMPLE 18

Approximately 1800 L of skimmilk was pasteurized and then cooled to 8 to 10° C. before rennet was added (100 ml). The renneted milk was left to stand overnight approximately 16 hours at 8 to 10° C. Dilute sulphuric acid was then added to the cold renneted milk, in-line immediately prior to cooking at 42 to 44° C., to reduce the pH to pH 5.3. The cooking and washing process used was as outlined in Example 3.

After dewatering the curd was allowed to cheddar and frozen for later use. On thawing the cheddared curd was milled. Water (1.1 kg), salt (0.2 kg), high fat cream (3.0 kg) and 0.272 kg of lactic acid (16% solution) were added to 7 kg of milled curd.

The curd and added ingredients were blended in a twin screw auger blender/cooker, heated to ≈68° C. and packed and stored under chilled conditions as outlined in Example 3.

The final cheese composition was 19.5% fat, 53.3% moisture, 1.61% salt, pH 5.33, and a calcium level of 61 mmol/kg cheese.

The cheese made by this process was a mozzarella or mozzarella-like cheese. Within 10 days of manufacture pizzas were made to evaluate cheese functionality. Cheese made by this process showed similar functional properties in terms of blister size, coverage and colour, background colour, melt appearance, oil off, stretch characteristics and in-mouth tenderness as a conventionally made mozzarella cheese.

EXAMPLE 19

Approximately 1800 L of skimmilk was pasteurized and then cooled to 8 to 10° C. before rennet was added (100 ml). The renneted milk was left to stand overnight approximately 16 hours at 8 to 10° C. Dilute sulphuric acid was then added to the cold renneted milk, in-line immediately prior to cooking at 42 to 44° C., to reduce the pH to pH 5.3. The cooking and washing process used was as outlined in Example 3.

After dewatering the curd was allowed to cheddar and frozen for later use. On thawing the cheddared curd was milled. Water (0.75 kg), salt (0.165 kg), high fat cream (2.5 kg) and 0.272 kg of lactic acid (16% solution) were added to 7 kg of milled curd.

The curd and added ingredients were blended in a twin screw auger blender/cooker, heated to 68° C. and packed and stored under chilled conditions as outlined in Example 3.

The final cheese composition was 17.0% fat, 53.5% moisture, 1.42% salt, pH 5.33 and a calcium level of 68 mmol/kg cheese.

The cheese made by this process was a mozzarella or mozzarella-like cheese. Within 10 days of manufacture pizzas were made to evaluate cheese functionality. Cheese made made by this process showed similar functional properties in terms of blister size, coverage and colour, background colour, melt appearance, oil off, stretch characteristics and in-mouth tenderness as a conventionally made mozzarella cheese.

EXAMPLE 20

Approximately 2200 L of skimmilk was pasteurized and then cooled to 8 to 10° C. before rennet was added (120 ml). The renneted milk was left to stand overnight approximately 16 hours at 8 to 10° C. Dilute sulphuric acid was then added to the cold renneted milk, in-line immediately prior to cooking at 44° C., to reduce the pH to pH 5.3. The cooking and washing process used was as outlined in Example 3.

After dewatering the curd was allowed to cheddar and was then chilled for use 5 days later. When required the cheddared curd was milled. Water (3.1 kg), salt (0.69 kg), high fat cream (7.0 kg) and (0.035 kg) Tri Sodium Citrate were added to 12 kg of milled curd.

The curd and added ingredients were blended in a twin screw auger blender/cooker, heated to ≈68° C. as outlined in Example 3.

The 68° C. homogenous mass of curd was then placed in a dry, twin screw Mozzarella pilot plant cooker/stretcher (in-house design) and pumped through a (60 to 65° C.) jacketed, 10 barreled (16 mm×200 mm) String cheese extrusion head. The Mozzarella cooker/stretcher was used as a pump to push the molten curd through the extrusion head.

Strings were cut into approximately 300 to 400 mm lengths and cooled in chilled water for approximately 10 to 15 minutes. On removal from the chilled water bath the lengths of String cheese were trimmed to 200 mm, laid on trays and blast frozen (−32° C.) for at least 1 hour.

The final String cheese composition was 20.5% fat, 54.1% moisture, 2.28% salt, pH 6.03 and a calcium level of 87 mmol/kg cheese.

The String cheese made by this process showed similar fibrous texture and flavour characteristics as those obtained in commercial String cheese made from Mozzarella curd.

INDUSTRIAL APPLICATION

The processes of the present invention and cheese made using the processes have commercial application in the cheese industry. In particular, mozzarella cheese made by this process has application in the pizza making industry that utilises mozzarella and mozzarella-like (pizza) cheese in significant quantities.

It will be appreciated that it is not intended to limit the invention to the above examples only, many variations, such as might readily occur to a person skilled in the art being possible without departing from the scope as defined in the appended claims.

What we claim is:

1. A process of making cheese comprising steps of:
   a) adding a coagulating agent to a starting milk under conditions of temperature time and coagulating agent concentration, which suppresses the formation of a coagulum;
   b) passing the milk of step a) along a flow path and adjusting the pH where necessary to between 4.0 and 6.0 by adding an acidulent;
   c) cooking the milk of step b) at a temperature which allows the formation of coagulated curd particles within the flow;
   d) separating the coagulated curd particles from the whey liquid;
   e) heating and mechanically working the curd particles into a cheese mass at a temperature of 50 to 90° C. in a substantially dry environment; and
   f) shaping and cooling the cheese.

2. A process of making cheese comprising steps of:
   a) providing a starting milk composition having a fat content of at least 0.05%;
   b) optionally pasteurising the milk composition of step a;
   c) adding a coagulating agent to the starting milk composition, and reacting under conditions of time, temperature and coagulating agent concentration, which suppresses the formation of a coagulum;
   d) adding an acidulent to the milk composition to reduce the pH to a level of 4.0 to 6.0;
   e) cooking the milk composition under conditions which allow for the formation of coagulated curd particles;
   f) separating the curd particles from whey liquid;
   g) optionally adjusting the mineral content of the curd particles;
   h) optionally freezing and/or drying the curd particles;
   i) heating and mechanically working the fresh curd particles of step (f) or (g), or the thawed and/or reconstituted curd particles of step (h) at a curd temperature of 50° C. to 90° C. into a cheese mass in a substantially dry environment; and
   j) shaping and cooling the cheese.

3. The process of claim 1 wherein the steps a to f are performed in the recited order.

4. The process of claim 2, wherein the steps a to j are performed in the recited order, including steps b), g), and h).

5. A process as claimed in claim 1, wherein the cheese comprises a soft, semi-soft, hard or extra hard cheese.

6. A process as claimed in claim 5, wherein the cheese comprises cheddar, cheddar-like cheese, gouda, gouda-like cheese, mozzarella or mozzarella-like cheese.

7. A process as claimed in claim 1, wherein the starting milk is selected from the group consisting of whole fat milk; whole milk retentate/concentrate; semi skimmed milk; skimmed milk; skimmed milk retentate/concentrate, butter milk; butter milk retentate/concentrate; whey protein retentate/concentrate; milk powder and from any suitable product made from milk.

8. A process as claimed in claim 7, wherein said milk powder is selected from the group consisting of whole milk powder, skimmed milk powder, milk protein concentrate powder, whey protein concentrate powder, whey protein isolate powder and buttermilk powder and other powder made from milk, and is used in a reconstituted or dry form, singularly or in combination as the starting milk or is added to the starting milk.

9. A process as claimed in claim 1, wherein the starting milk is sourced from any milk producing animal.

10. A process as claimed in claim 1, wherein a further step of standardization to alter the fat and protein composition, is carried out on the starting milk before the addition of coagulating agent or after the curd particles have been separated and before the heating and mechanical working step.

11. A process as claimed in claim 1, wherein the coagulating agent is a coagulating enzyme selected from the group consisting of rennet/chymosin and other enzymes capable of converting kappa-casein into para kappa-casein.

12. A process as claimed in claim 1, wherein the conditions which suppress the formation of a coagulum comprise a temperature of less than 22° C. for 3 to 20 hours at a coagulating agent concentration which will allow coagulation at the cooking step.

13. A process as claimed in claim 12, wherein the conditions which suppress the formulation of a coagulum comprise a temperature of between 8 and 10° C., for 16 hours at a coagulating agent concentration which will allow coagulation at the cooling step.

14. A process as claimed in claim 1, wherein acidification is by the addition of an acidulent directly in-line to reduce the pH of the reacted milk to between pH 4.0 and 6.0.

15. A process as claimed in claim 14, wherein the acidulent is a food grade inorganic or organic acid selected from sulfuric acid, lactic acid, acetic acid, hydrochloric acid and citric acid or a mixture or thereof.

16. A process as claimed in claim 14, wherein the acidulent comprises a growth medium which has been inoculated with a starter culture and reacted to form a fermentate.

17. A process as claimed in claim 16, wherein the starter culture added to the growth medium is a mesophilic or thermophilic bacteria or a mixture thereof and is added at 0.0005 to 5% of the milk volume.

18. A process as claimed in claim 17, wherein the starter culture is selected from the group comprising *Streptococcus thermophilus, Lactobacillus bulgaricus, Lactobacillus helveticus, Lactococcus lactis* subspecies *cremoris, Lactococcus lactis* subspecies *lactis* or any other suitable bacterium.

19. A process as claimed in claim 16, wherein a fermentate is prepared by heating a growth medium selected from skim milk, skim milk retentate, reconstituted skim milk, or any other commercially available starter medium to a temperature optimal for the growth of the culture to be grown, adding the culture and allowing fermentation to proceed until the pH of the growth medium has reached a target pH of 4.0 to 6.0.

20. A process as claimed in claim 19, where the target pH is 4.5 to 6.0.

21. A process as claimed in claim 19, wherein once the fermentate has reached its target pH it is added to the reacted milk, directly in-line and a further step of mixing and holding is carried out.

22. A process as claimed in claim 14 wherein the pH of the reacted milk is reduced to pH 5.2 to 6.0.

23. A process as claimed in claim 1, wherein one or more GRAS ingredients are added at any one or more of steps of the process.

24. A process as claimed in claim 23, wherein one or more GRAS ingredients are added during the heating and mechanical working step.

25. A process as claimed in claim 23, where one or more GRAS ingredients are added during the shaping and cooling step.

26. A process as claimed in claim 1, further comprising a step of washing the curd particles after separating from whey.

27. A process as claimed in claim 26, wherein said washing step is carried out using water at a pH of 3.0 to 5.4 to produce curd particles with a reduced calcium content.

28. A process as claimed in claim 2, wherein step g comprises a washing step carried out using water at a pH of 3.0 to 5.4 to produce curd particles with a reduced calcium content.

29. A process as claimed in claim 2, wherein the cheese comprises a soft, semi-soft, hard or extra hard cheese.

30. A process as claimed in claim 2, wherein the starting milk is selected from the group consisting of whole fat milk; whole milk retentate/concentrate; semi skimmed milk; skimmed milk; skimmed milk retentate/concentrate, butter milk; butter milk retentate/concentrate; whey protein retentate/concentrate; milk powder and from any suitable product made from milk.

31. A process as claimed in claim 2, wherein the starting milk is sourced from any milk producing animal.

32. A process as claimed in claim 2, wherein a further step of standardization to alter the fat and protein composition, is carried out on the starting milk before the addition of coagulating agent or after the curd particles have been separated and before the heating and mechanical working step.

33. A process as claimed in claim 2, wherein the coagulating agent is a coagulating enzyme selected from the group consisting of rennet/chymosin and other enzymes capable of converting kappa-casein into para kappa-casein.

34. A process as claimed in claim 2, wherein the conditions which suppress the formation of a coagulum comprise a temperature of less than 22° C. for 3 to 20 hours at a coagulating agent concentration which will allow coagulation at the cooking step.

35. A process as claimed in claim 2, wherein acidification is by the addition of an acidulent directly in-line to reduce the pH of the reacted milk to between pH 4.0 and 6.0.

36. A process as claimed in claim 20, wherein once the fermentate has reached its target pH it is added to the reacted milk, directly in-line and a further step of mixing and holding is carried out.

37. A process as claimed in claim 2, wherein one or more GRAS ingredients are added at anyone or more of steps of the process.

38. A process as claimed in claim 37, wherein one or more GRAS ingredients are added during the heating and mechanical working step.

39. A process as claimed in claim 37, where one or more GRAS ingredients are added during the shaping and cooling step.

40. A process as claimed in claim 23, wherein said washing step is carried out using water at a pH of 3.0 to 5.4 to produce curd particles with a reduced calcium content.

41. A process as claimed in claim 37, wherein said washing step is carried out using water at a pH of 3.0 to 5.4 to produce curd particles with a reduced calcium content.

42. A process as claimed in claim 2, further comprising a step of washing the curd particles after separating from whey.

* * * * *